United States Patent [19]

Wilson

[11] E Re. 29,953

[45] Reissued Apr. 3, 1979

[54] APPARATUS FOR SUPPORTING AND POSITIONING OF A WORK-PIECE DURING WELDING

[76] Inventor: Bobby R. Wilson, 423 Kline Ave., Akron, Ohio 44305

[21] Appl. No.: 861,100

[22] Filed: Dec. 15, 1977

Related U.S. Patent Documents

Reissue of:

[64] Patent No.: 3,926,422
Issued: Dec. 16, 1975
Appl. No.: 515,224
Filed: Oct. 16, 1974

[51] Int. Cl.[2] ..... B23Q 3/18

[52] U.S. Cl. ..... 269/60; 269/71; 269/218; 269/242

[58] Field of Search ..... 269/55, 58–61, 269/218, 242, 71; 228/44; 214/1 R, 1 D, 1 P, DIG. 3, DIG. 4; 29/200 P

[56] References Cited

U.S. PATENT DOCUMENTS

| | | | |
|---|---|---|---|
| 1,511,298 | 10/1924 | Petzold | 269/218 |
| 2,240,688 | 5/1941 | Conner | 269/242 |
| 3,045,727 | 7/1962 | Clarke | 269/58 |
| 3,124,018 | 3/1964 | Gough | 269/60 |
| 3,386,726 | 6/1968 | Lorenz | 269/55 |
| 3,463,137 | 8/1969 | Hare | 269/60 |
| 3,580,459 | 5/1971 | Gage | 269/242 |

FOREIGN PATENT DOCUMENTS

| | | | |
|---|---|---|---|
| 827923 | 1/1952 | Fed. Rep. of Germany | 269/153 |
| 148426 | 1/1955 | Sweden | 269/55 |

*Primary Examiner*—Robert C. Watson
*Attorney, Agent, or Firm*—Oldham, Oldham, Hudak & Weber Co.

[57] ABSTRACT

An apparatus for supporting and positioning of a work-piece during welding. A base plate has a transverse drive means and slidably carries a secondary plate. The secondary plate has drive elements engaged by the transverse drive means and carries a vertically and horizontally adjustable mechanism which provides means for engaging a work-piece during welding.

10 Claims, 3 Drawing Figures

APPARATUS FOR SUPPORTING AND POSITIONING OF A WORK-PIECE DURING WELDING

Matter enclosed in heavy brackets [ ] appears in the original patent but forms no part of this reissue specification; matter printed in italics indicates the additions made by reissue.

CROSS-REFERENCE TO RELATED APPLICATIONS

This is a substitute application for Ser. No. 251,373, filed May 8, 1972, entitled MECHANICAL SADDLE, now abandoned.

BACKGROUND OF THE INVENTION

The invention relates to an apparatus for supporting and positioning of a work-piece during welding.

An adjustable cradle for the handling of missiles and the like is disclosed in U.S. Pat. No. 3,338,433, August, 1967, Mattson, et al.

For an example of prior art work supporting and rotating apparatus, see U.S. Pat. No. 3,007,428, November, 1961, Wuesthoff.

U.S. Pat. No. 3,675,915, July, 1972, Vigus discloses a work-piece supporting and positioning apparatus for the manipulation of large diameter, high pressure reactor vessels.

Various prior art devices have been utilized for supporting work-pieces, such as boiler shells. The vertical and lateral alignment for welding of shell portions has heretofore been accomplished only in a difficult, tedious and time consuming manner.

It has been found that the subject matter of the invention is easily adjustable to support work-pieces of various size and is vertically and laterally adjustable to provide for relatively fast and easy positioning of a work-piece during welding.

SUMMARY OF THE INVENTION

The object of the invention is to provide an improved apparatus for supporting and positioning of a work-piece during welding.

It is a further object of the invention to provide an apparatus which is adjustable to support work-pieces of various size and which has vertical and lateral positional capabilities.

These and other objects of the invention, and the advantages thereof, will be apparent in view of the Detailed Description of the Invention, as set forth below.

In general, an apparatus according to the invention includes a base plate, a secondary plate and an adjustable mechanism providing means for engaging a work-piece. The base plate has a transverse drive means and slidably carries the secondary plate. The secondary plate has drive elements to engage the transverse drive means for sliding movement of the secondary plate relative to the base plate. The secondary plate carries a mechanism which provides a means for engaging a work-piece during welding and which is vertically and laterally adjustable.

DETAILED DESCRIPTION OF THE INVENTION

Figure 1:
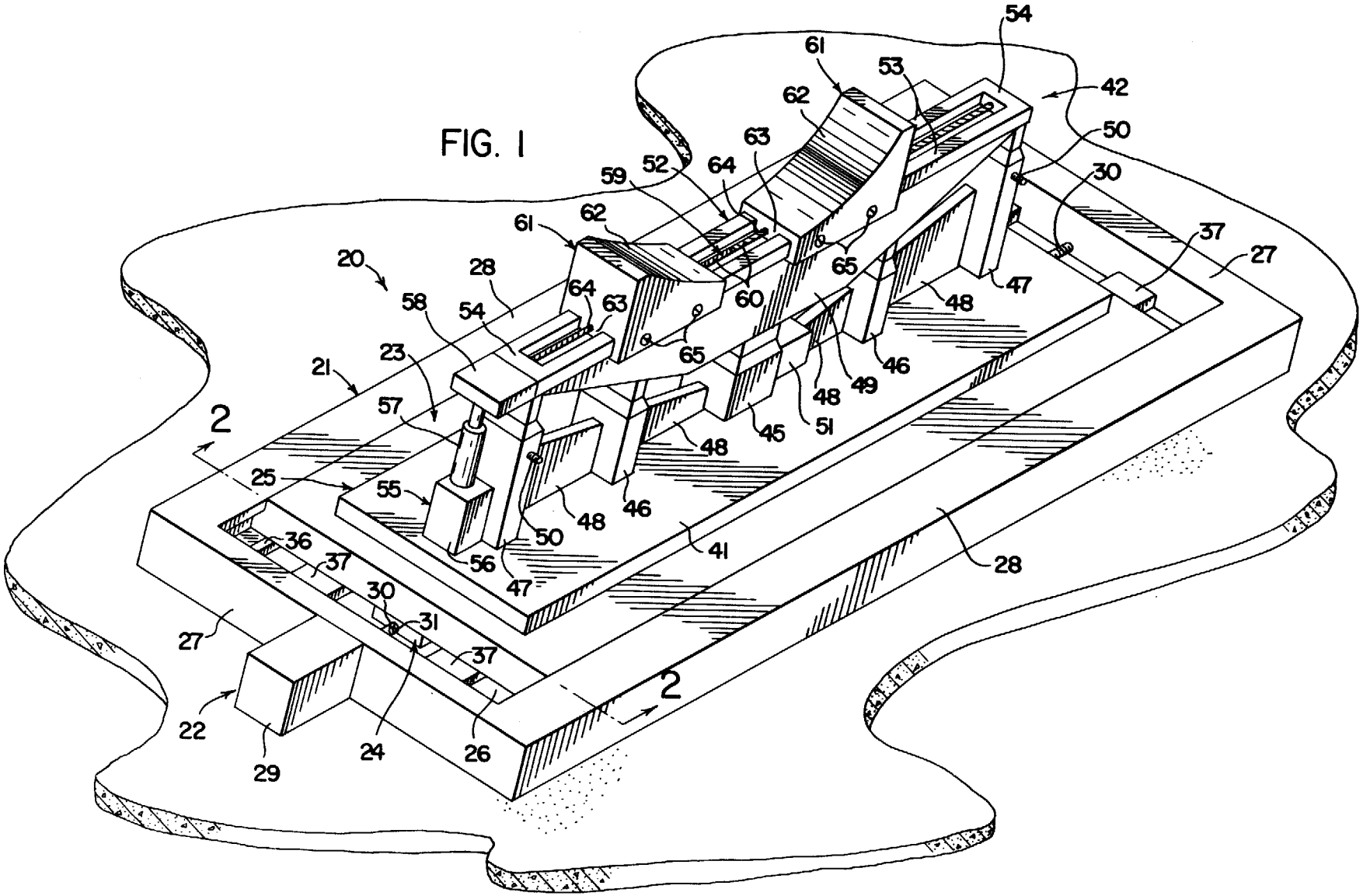
FIG. 1 is a perspective view of an apparatus according to the invention.

According to the invention, an apparatus for supporting and positioning of a work-piece (not shown), for example a boiler shell portion, during welding is indicated generally by the numeral 20. The apparatus 20 includes a base plate indicated generally by the numeral 21 having a transverse drive means indicated generally by the numeral 22.

The base plate 21 carries a secondary plate referred to generally by the numeral 23 having therebeneath drive elements referred to generally by the numeral 24 for engagement by the drive means 22. The drive means 22 and drive elements 24 provide for sliding movement of the secondary plate 23 relative to the base plate 21.

The secondary plate 23 carries a vertically and laterally adjustable mechanism indicated generally by the numeral 25 which provides means for engaging a work-piece during welding.

Referring to FIG. 1, a base plate 21 according to the preferred embodiment is a box-like element comprising a floor 26, opposed ends 27 and opposed guide rails 28. A transverse drive means 22 comprises a conventional motor 29 having suitable gearing to drive an elongate drive screw 30 extending across the base plate 21 and above the floor 26 and supported by and rotatably secured within the opposed ends 27.

Figure 2:
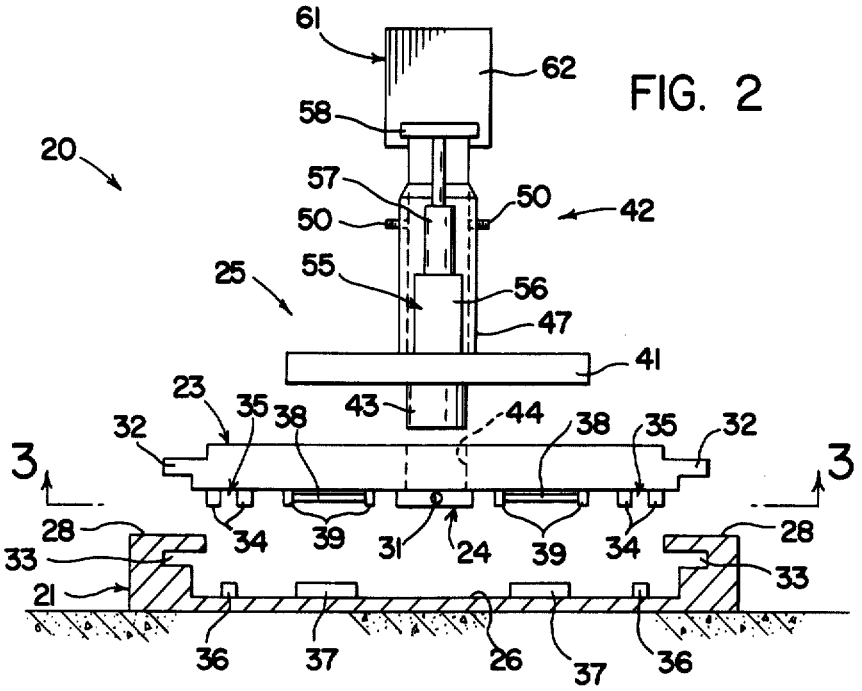
FIG. 2 is a fragmentary or exploded view, taken substantially as indicated on line 2—2 of FIG. 1, showing elements of an apparatus according to the invention.
Figure 3:
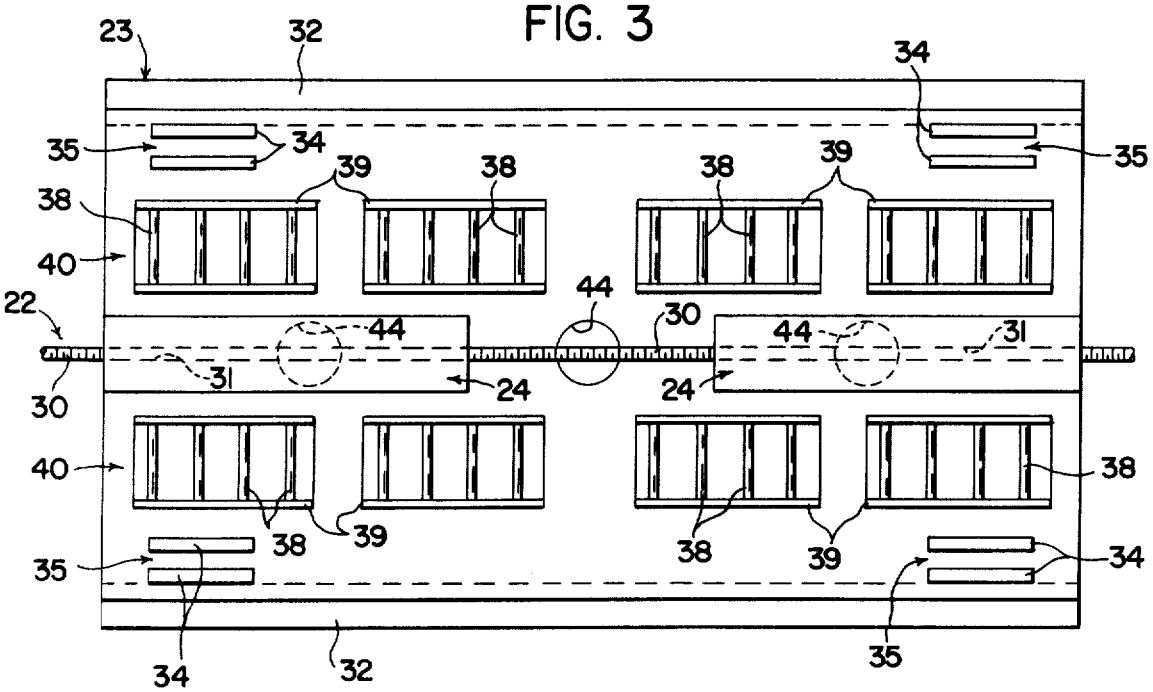
FIG. 3 is a view taken substantially as indicated on line 3—3 of FIG. 2.

Referring to FIGS. 2 and 3, the secondary plate 23 has drive elements 24 on the underside thereof having a threaded bore 31 therethrough for threaded engagement by the drive screw 30. The secondary plate 23 has opposed tongues or ribs 32 at the sides thereof for mating engagement with the grooves or slots 33 of opposed guide rails 28 to slidably secure the secondary plate 23 on the base plate 21.

Upon activation of the drive means 22, the motor 29 causes the drive screw 30 to rotate, imparting translational motion to the secondary plate 23 through the drive elements 23 and causing the secondary plate 23 to move laterally relative to the base plate 21.

To further guide the lateral movement of the secondary plate 23 relative to the base plate 21, guide blocks 34 are provided on the underside of the secondary plate 23 and oriented so as to effectively provide dual guide ways, indicated generally at 35. The guide blocks 34 may extend the entire length of the underside of the secondary plate 23 or, as shown in FIG. 3, may be arranged in pairs of spaced-apart segments. The floor 26 of the base plate 21 has thereon dual elongated guide keys 36 positioned for sliding engagement and movement within the dual guide ways 35.

To facilitate the sliding of the secondary plate 23 on the base plate 21, elongated tracks 37 are provided on the floor 26 of the base plate 21, projecting upwardly therefrom. Roller bearings 38 are rotatably secured within bearing housings 39 positioned on the underside of the secondary plate 23 in alignment with the tracks 37 to effectively provide dual bearing paths, indicated generally at 40, for rolling movement of the secondary plate 23 on the base plate 21. Each bearing path 40 may comprise a single continuous housing 39 or, as shown in FIG. 3, a path 40 may comprise a series of separate and aligned housings 39.

Referring again to FIG. 1, the secondary plate 23 carries thereon an adjustable mechanism 25. The mechanism 25 comprises a primary plate 41 and a vertically adjustable saddle, indicated generally by the numeral 42, carried thereon. The primary plate 41 is positioned on the secondary plate 23 as by dowel pins 43 projecting from the underside of the primary plate 41 and inserted into corresponding openings 44 in the secondary plate 23.

The saddle 42 of the mechanism 25 may comprise a series of vertically adjustable telescopic stanchions—a central stanchion 45, intermediate stanchions 46 and outer stanchions 47—having therebetween web portions 48, and carrying a saddle head 49.

The central stanchion 45 houses therein a lifting means (not shown), for example a conventional mechanical jack, for vertically adjusting the saddle head 49, which may be locked in the desired vertical position as by lock screws 50 in the outer stanchions 47. The lifting means may be actuated by a suitable actuation means 51, for example a conventional electric motor.

The saddle head 49 has thereon a track, indicated generally at 52, comprising dual side rails 53 and end stops 54. A drive means, indicated generally at 55, comprises a conventional motor 56 connected by an extensible drive shaft 57 to a gear box 58 containing suitable gearing to drive an elongate drive screw 59 with double and opposite hand thread portions 60 supported by and rotatably secured within the end stops 54. The drive shaft 57 is of conventional construction, with the upper portion telescopically received within the lower portion in a torque-transmitting manner, as by conventional keys or splines (not shown) dimensioned for a sliding fit. The track 52 carries work-piece engaging means, indicated generally at 61. As shown in FIG. 1, the work-piece engaging means 61 may comprise opposed movable jaws 62 mounted for sliding movement on the track 52 and guided by the dual side rails 53 extending therethrough. Each jaw 62 has a central portion 63 with a threaded bore 64 therethrough for engagement by the thread portions 60 of the drive screw 59.

The opposed jaws 62 are adjustable laterally toward and away from one another, by actuation of the drive means 55, to accommodate work-pieces of various size. The lateral outer motion of the opposed jaws 62 along the track 52 is limited by the end stops 54. When in the desired lateral position, the opposed jaws 62 may be locked, as by lock screws 65. To minimize the load placed on the keys or splines of the drive shaft 57, adjustment of the saddle head 49 and of the work-piece engaging means 62 should be performed consecutively and not simultaneously.

What is claimed is:

[1. Apparatus for supporting and positioning of a work-piece during welding, including a base plate having a transverse drive means, a secondary plate carried by said base plate and having at least one drive element engaged by said transverse drive means and a vertically and laterally adjustable mechanism carried by said secondary plate and providing means for engaging a work-piece during welding, said base plate having opposed guide rails with slots for mating engagement with rib areas on said secondary plate to slidably secure said secondary plate on said base plate and to prevent vertical movement of said secondary plate relative to said base plate, said transverse drive means comprising an elongate drive screw rotatably supported by said base plate, each drive element being located on the underside of said secondary plate and having a threaded bore therethrough for threaded engagement by said drive screw, whereby said secondary plate will slide relative to said base plate upon actuation of said drive screw, said secondary plate having therebeneath dual guide ways for slidably receiving guide keys on said base plate and guiding the sliding movement of said secondary plate relative to said base plate, said base plate having dual elongated tracks thereon in aligned relation to bearings housed beneath said secondary plate for rolling movement of said secondary plate on said base plate, said mechanism comprising a saddle carried above said secondary plate, said saddle having an upper portion telescopically received by a lower portion, said upper portion being vertically adjustable by a lifting means housed within said lower portion, the upper portion of said saddle including a track for slidably carrying the work-piece engaging means and rotatably carrying a second elongate drive screw having double and opposite hand threaded portions, said work-piece engaging means comprising opposed movable jaws positioned for sliding movement on said track, each jaw having therethrough a threaded bore for engagement by the threaded portions of said second drive screw, whereby said opposed jaws will slide laterally toward or away from one another on said track upon actuation of said second drive screw.]

*2. Apparatus for supporting and positioning of a work-piece during welding, comprising:*

*a base plate;*

*a secondary plate carried by said base plate;*

*transverse drive means interconnected between said base and secondary plates causing relative positional movement between said plates;*

*a vertically adjustable mechanism carried by said secondary plate and providing means for supporting a work-piece during welding; and*

*wherein said mechanism comprises a saddle carried above said secondary plate, said saddle having an upper portion telescopically received by a lower portion, said upper portion being supported by lifting means for vertically adjusting the position of said saddle.*

*3. The apparatus according to claim 2 wherein said lifting means is housed within said lower portion.*

*4. The apparatus according to claim 3 wherein said lifting means comprises a jack.*

*5. The apparatus according to claim 2 wherein said secondary plate is slidingly supported by said base plate.*

*6. The apparatus according to claim 2 wherein said transverse drive means is interconnected between one end of said base plate and a proximate end of said secondary plate.*

*7. The apparatus according to claim 2 wherein said saddle is supported by a plurality of telescopic stanchions.*

*8. The apparatus according to claim 7 wherein a center one of said stanchions maintains a jack therewithin, said jack comprising said lifting means.*

*9. The apparatus according to claim 2 wherein said mechanism is laterally, as well as vertically, adjustable.*

*10. The apparatus according to claim 2 wherein said secondary plate further includes dual guide ways therebeneath for slidably receiving guide keys on said base plate and guiding the sliding movement of said secondary plate relative to said base plate.*

*11. The apparatus according to claim 2 wherein said saddle is carried upon a track, said saddle comprising two sections in sliding engagement with said track and including means in engagement with said sections for closing and separating said sections upon said track.*

* * * * *